Jan. 18, 1955 W. A. COST 2,699,852
THREE-WAY DRIVING DEVICE
Filed Dec. 13, 1951
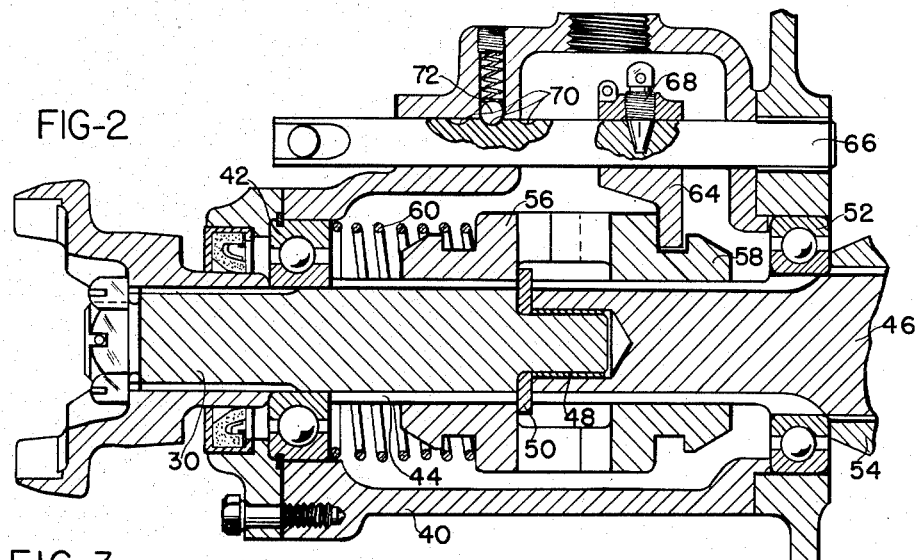
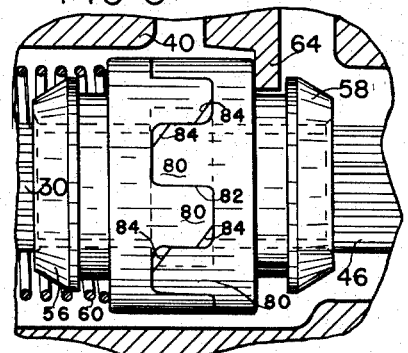
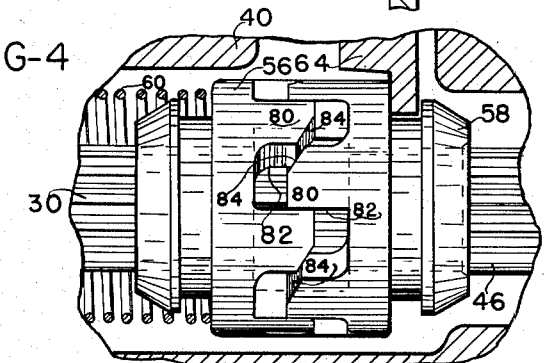
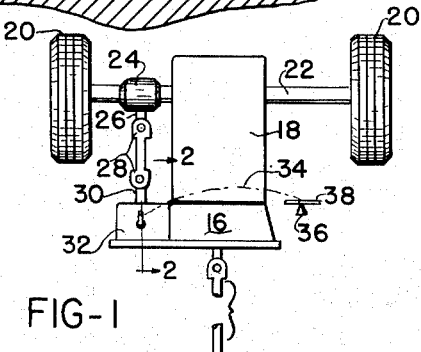
INVENTOR
WILLIAM A. COST
BY Toulmin & Toulmin
ATTORNEYS

United States Patent Office 2,699,852
Patented Jan. 18, 1955

2,699,852

THREE-WAY DRIVING DEVICE

William A. Cost, Indianapolis, Ind., assignor to Marmon-Herrington Company, Inc., Indianapolis, Ind., a corporation of Indiana Application December 13, 1951, Serial No. 261,475

3 Claims. (Cl. 192—46)

This invention relates to a driving mechanism, and particularly to a driving mechanism for being incorporated in the drive to the front wheels of a four-wheel drive vehicle or the like.

Vehicles having four-wheel drives are generally arranged so the drive to the front wheels can be selectively engaged or disengaged according to the particular conditions which are encountered during operation of the vehicle. Heretofore, such drives have been adjustable into only driving or disengaged positions, and this entailed certain disadvantages, because there are times when it is desired to drive all four wheels, but during which times there may be periods when the front wheels will tend to overrun the back wheels. With driving devices according to the prior art, an arrangement of this type required skidding of either the front or the back wheels, and this not only caused a great deal of tire wear, but also imposed severe stresses on the drive instrumentalities between the vehicle engine and the wheels.

Having the foregoing in mind, the present invention has as its primary object the provision of an improved arrangement for connecting the front wheels of a four-wheel drive vehicle with the vehicle engine in order to overcome the drawbacks referred to above.

A particular object of this invention is to provide a device for connecting the front wheels of a four-wheel drive vehicle with the engine thereof so that neither the front nor back wheels of the vehicle will slide during operation of the vehicle.

Another particular object is the provision of a device for connecting the front wheels of a four-wheel drive vehicle with the engine so that the device can be adjusted to permit the front wheels to overrun the rear wheels when conditions change during operation of the vehicle, and without any attention from the vehicle operator.

These and other objects and advantages will become more apparent upon reference to the following description taken in connection with the accompanying drawings, in which:

Figure 1 is a diagrammatic plan view showing a typical vehicle arrangement in which the drive mechanism of the present invention is useful;

Figure 2 is a vertical section indicated by line 2—2 on Figure 1 showing the device of this invention;

Figure 3 is a fragmentary view showing the device in positive drive engagement;

Figure 4 is a view like Figure 3 but showing the device engaged so the front wheels can overrun the back wheels; and Figure 5 is a view like Figures 3 and 4 but showing the device disengaged.

Referring to the drawings more in detail, the arrangement shown in Figure 1 is diagrammatic and illustrates a pair of rear wheels 10 connected through the rear axle structure 12 with a propeller shaft 14 leading to a transmission 16 adapted for being driven by an engine 18. The vehicle also comprises front wheels 20 adapted for being driven through the front wheel axle structure 22, including the side positioned differential 24 which is driven by propeller shaft 26 through a universal joint 28.

Propeller shaft 26 is connected through another universal joint 28 with a shaft 30 extending into the housing of the device of the present invention, and which is generally indicated at 32.

The device is adapted for adjustment into its several operative positions by means of a shiftable member which may be connected by a control linkage, indicated at 34, with an operating element 36 on the dash 38 in the cab of the vehicle. In this manner the adjustment of the unit is under the control of the vehicle operator at all times.

Turning now to Figure 2, the housing of the unit is indicated by numeral 40, and it will be seen that output shaft 30 of the unit is supported adjacent the one end of the housing by the antifriction bearing 42. Rightwardly of bearing 42 shaft 30 is splined, as at 44, and the extreme end of the shaft is of reduced diameter so as to telescope into the bored end of input shaft 46 of the unit. A bearing 48 journals the telescopic portions of the shafts and a thrust washer 50 is interposed between the ends of the shafts.

Shaft 46 is supported at the right end of the housing 40 by anti-friction bearing 52 and rightwardly of bearing 52 shaft 46 is adapted for mounting a drive gear 54 that engages a suitable gear in the transmission 16, previously referred to.

Shaft 46 is splined in the same manner as shaft 30, and slidably mounted on the splined portions of the shafts are the jaw clutch members 56 and 58. Clutch member 56 is mounted on shaft 30 and is continuously urged toward abutting engagement with thrust washer 50 by compression spring 60 which engages the said clutch member at one end, and at its other end bears against the outer race of bearing 42.

Clutch member 58 is adjustable lengthwise of shaft 46 by virtue of shifting fork 64 that engages an annular groove about the clutch member, and which is mounted on rod 66 and locked thereto, as by the set screw 68. Rod 66 extends outside casing 40 where it is connected with any suitable shifting means, such as the linkage identified by reference numeral 34 in Figure 1.

Clutch member 58 has three operative positions, as will be disclosed hereinafter, and in order to position the said clutch member properly in the said three positions, rod 66 has recesses 70 therein for engagement by spring pressed ball 72. This detent mechanism is simple and inexpensive, but provides for three predetermined positions of rod 66, shifter fork 64, and clutch member 58.

As will be seen in Figures 3, 4, and 5, the two clutch members 56 and 58 are identical, and each comprises a plurality of teeth 80 separated by spaces 82, and which spaces are of a size closely to receive the teeth of the other clutch member. Each tooth 80 of each clutch member has one side beveled, as at 84, the said bevel being located at the corner of each tooth, so that there is a substantial axial portion of each tooth that is intact. The purpose of this arrangement is to provide for a fully engaged position of the teeth, as illustrated in Figure 3, and wherein a positive drive from clutch member 58 into clutch member 56 is had in either direction of rotation. With the clutch parts shifted into their Figure 3 position a positive drive obtains at all times from the engine of the vehicle to the front wheel axle in both forward and reverse directions.

When it is desired to adjust the device to permit the front wheels to overrun the back wheels, clutch member 58 is shifted to the position in which it is illustrated in Figures 2 and 4. It will be noted in these figures, particularly in Figure 4, that the teeth 80 of the members are in engagement on only one side thereof, and that on the opposite sides of the teeth the bevel portions 84 are in opposition. Thus, should the shaft 30, which is drivingly connected with the front wheels, overrun the shaft 46, which is drivingly connected with the engine of the vehicle and with the rear wheels, the teeth of clutch member 56 will cam over the teeth of clutch member 58 and the desired effect will be obtained.

In Figure 5 the clutch members 56 and 58 are shown in the relative positions which they occupy when completely disengaged, and with the clutch members in their Figure 5 position, shaft 30 and the front wheel structure connected therewith operate entirely independently of the driving of shaft 46 and the engine and rear wheel structure to which it is connected.

It will be understood that this invention is susceptible to modification in order to adapt it to different usages

I claim:

1. In a driving device of the nature described: a housing, a driven and driving shaft extending into said housing from each end, said shafts being journaled in said housing for independent rotation and having their adjacent ends in telescopic engagement, a thrust washer disposed between the ends of said shafts and projecting radially outwardly, a pair of identical clutch members, one slidably splined to each shaft, each having axially projecting teeth thereon extending toward the other clutch member, the corresponding corner on the outer end of each of said teeth being beveled and there being a straight axial portion on each tooth between the bevel and the bottom of the adjacent tooth space, whereby the clutch members can be fully engaged for a positive drive in either direction or partially engaged for a positive drive in only one direction, a spring resiliently urging the clutch member on said driven shaft against said thrust washer, and means for shifting the other clutch member between positions of full engagement, partial engagement, and full disengagement with said one clutch member.

2. In a driving device of the nature described: a housing, a driven and a driving shaft extending into said housing from each end, said shafts being journaled in said housing for independent rotation and having their adjacent ends in telescopic engagement, a thrust washer disposed between the ends of said shafts and projecting radially outwardly, a pair of identical clutch members, one slidably splined to each shaft, each having axially projecting teeth thereon extending toward the other clutch member, the corresponding corner on the outer end of each said tooth being beveled and there being a straight axial portion on each tooth between the bevel and the bottom of the adjacent tooth space, whereby the clutch members can be fully engaged for a positive drive in either direction or partially engaged for a positive drive in only one direction, a spring resiliently urging the clutch member on said driven shaft against said thrust washer, a rod shiftable in said casing and connected with said other clutch member for shifting it from disengaged position with said one clutch member into either partial or full engagement with the said one clutch member, and detent means associated with the rod for locking said clutches in each of the three operative positions thereof.

3. A driving device comprising a housing, a transmission shaft extending into one end of said casing, a driven shaft extending into the other end of said casing, said driven shaft being axially aligned with said transmission shaft, a first clutch member slidably splined on the end of the transmission shaft within the casing, a second clutch member slidably splined on the end of the driven shaft within the casing, teeth axially projecting from each clutch member toward the other clutch member with the spaces between the teeth being adapted for closely receiving the teeth of the other clutch member, one corner of each tooth being beveled to give a positive drive in only one direction when said clutch members are partially engaged and to give a positive drive in both directions when said clutch members are fully engaged, means between said shafts to restrain axial movement of the second clutch member toward the first clutch member, means resiliently urging the second clutch member toward said restraining means, means for axially shifting said first clutch member into positions of full engagement, partial engagement, and complete disengagement, and means for locking said shifting means in each of said positions.

References Cited in the file of this patent

UNITED STATES PATENTS

| Number | Name | Date |
|---|---|---|
| 915,568 | Douglas | Mar. 16, 1909 |
| 1,351,084 | Winther | Aug. 31, 1920 |
| 1,914,678 | Starkey et al. | June 20, 1933 |
| 2,049,126 | Maybach | July 28, 1936 |
| 2,107,072 | Herrington | Feb. 1, 1938 |
| 2,185,636 | Kysor | Jan. 2, 1940 |
| 2,354,300 | Bock | July 25, 1944 |

FOREIGN PATENTS

| Number | Country | Date |
|---|---|---|
| 426,659 | Italy | Nov. 5, 1947 |